United States Patent
Gouzou et al.

(10) Patent No.: US 7,491,258 B2
(45) Date of Patent: Feb. 17, 2009

(54) FUEL TANK VENTILATION DEVICE

(75) Inventors: Christophe Gouzou, Châlons en Champagne (FR); Eric Renard, Compertrix (FR); Humbert de Monts de Savasse, Reims (FR)

(73) Assignee: TI Automotive Fuel Systems SAS, Châlons en Champagne (FR)

( * ) Notice: Subject to any disclaimer, the term of this patent is extended or adjusted under 35 U.S.C. 154(b) by 509 days.

(21) Appl. No.: 11/267,898

(22) Filed: Nov. 4, 2005

(65) Prior Publication Data
US 2006/0096258 A1    May 11, 2006

(30) Foreign Application Priority Data
Nov. 5, 2004 (FR) .................. 04 11842

(51) Int. Cl.
*B01D 53/22* (2006.01)
*B01D 50/00* (2006.01)

(52) U.S. Cl. ............ 95/46; 95/47; 95/54; 95/146; 96/6; 96/8; 96/10; 96/14; 96/136; 55/385.4; 55/417; 220/746; 220/562; 137/588; 137/589; 210/640; 210/650

(58) Field of Classification Search ............ 96/6, 96/8, 10, 14, 134, 136, 179; 95/45, 46, 47, 95/50, 54, 141, 143, 146; 55/385.4, 417, 55/523; 220/746, 562, 86.2; 137/587, 588, 137/589; 210/640, 650
See application file for complete search history.

(56) References Cited

U.S. PATENT DOCUMENTS

| | | | | |
|---|---|---|---|---|
| 3,631,654 A | * | 1/1972 | Riely et al. | 96/6 |
| 4,315,579 A | | 2/1982 | Martin, Jr. et al. | |
| 4,853,013 A | * | 8/1989 | Rio et al. | 96/6 |
| 4,963,169 A | * | 10/1990 | Granville | 220/746 |
| 4,997,455 A | * | 3/1991 | Herbstman et al. | 44/407 |
| H928 H | * | 6/1991 | Gallegos | 417/395 |
| 5,116,257 A | * | 5/1992 | Szlaga | 220/746 |
| 5,722,374 A | * | 3/1998 | Kidokoro et al. | 123/516 |
| 5,891,223 A | * | 4/1999 | Shaw et al. | 55/385.4 |
| 6,405,747 B1 | | 6/2002 | King et al. | |
| 6,439,277 B1 | * | 8/2002 | Kyburz | 220/746 |
| 6,719,824 B1 | * | 4/2004 | Bowser | 95/50 |
| 6,942,124 B2 | * | 9/2005 | Dehn et al. | 220/86.2 |
| 2001/0035421 A1 | * | 11/2001 | Essing | 220/746 |
| 2007/0175514 A1 | * | 8/2007 | Tharp et al. | 137/588 |

FOREIGN PATENT DOCUMENTS

| | | |
|---|---|---|
| EP | 0 327 759 A | 8/1989 |
| GB | 1019261 A | 2/1966 |
| WO | WO 95/03949 * | 2/1995 |
| WO | WO 2004/036096 A | 4/2004 |

* cited by examiner

*Primary Examiner*—Jason M Greene
(74) *Attorney, Agent, or Firm*—Reising, Ethington, Barnes, Kisselle, P.C.

(57) ABSTRACT

A gas and liquid separation device for use with a fuel tank. The separation device includes a body having at least one passage therethrough in fluid communication with the fuel tank, and a gas and liquid separator carried by the body in fluid communication with the at least one passage and being oriented at an angle with respect to horizontal when in use.

20 Claims, 3 Drawing Sheets

FUEL TANK VENTILATION DEVICE

CROSS-REFERENCE TO RELATED APPLICATION

Applicants claim priority of French Application, Ser. No. FR0411842, filed Nov. 5, 2004.

FIELD OF THE INVENTION

This invention relates generally to tanks for automotive fuel tanks, and more particularly to ventilation devices for fuel tanks.

BACKGROUND OF THE INVENTION

A fuel tank ventilation device is typically located between a fuel tank and the atmosphere outside the tank, to prevent overpressure conditions within the tank. For example, FIG. 1 shows a ventilation device 20 of a fuel tank 10 according to the prior art. As shown, the ventilation device 20 includes a single pressure relief valve mounted to an upper wall 11 of the tank 10. But such ventilation devices are rarely in direct contact with the upper wall 11 of the tank 10, and are often placed at some distance from the tank 10 inline within a ventilation conduit, which is in fluid communication with the interior of the tank 10. And, in some fuel tank configurations, a ventilation device may be located within a common ventilation conduit, which is in fluid communication downstream of several ventilation conduits, which are individually in fluid communication with a fuel tank.

Ventilation devices often take the form of a pressure relief valve or a vapor recovery canister. Pressure relief valves allow gases within a fuel tank to escape to the atmosphere outside the tank to prevent a build up of pressure within the tank, and some pressure relief valves also allow gases from the atmosphere to enter the interior of the tank so as to prevent a vacuum condition or under pressurization within the tank. Vapor recovery canisters typically contain an activated carbon element, which captures gases escaping from the tank when there is a build up of pressure therein and thereby prevents such gases from escaping into the atmosphere. When pressure in the tank drops below the pressure in the vapor recovery canister, the captured gases flow back into the fuel tank.

Unfortunately, however, when the ventilation device opens to allow gases within the tank to exit the tank, liquid contained in the tank may also escape and may damage a pressure relief valve, particularly when the liquid is a fuel additive diluted in solvent. In such a case, when the liquid fuel additive comes into direct contact with the pressure relief valve and is exposed to air, the solvent eventually evaporates, thereby leaving only fuel additive. The additive tends to solidify around various parts of the pressure relief valve, thereby rendering the valve ineffective for its intended purpose. For example, valve seals may dry out and bond to other parts of the valve.

Another problem occurs where the ventilation device is a vapor recovery canister, wherein liquid fuel may flow out of the fuel tank and into the vapor recovery canister. Activated carbon within the canister can thus become impregnated and contaminated with liquid fuel, thereby rendering the vapor recovery canister ineffective for its intended purpose.

SUMMARY OF THE INVENTION

A gas and liquid separation device for a fuel tank, including a body having at least one passage therethrough in fluid communication with the fuel tank, and a gas and liquid separator carried by the body in fluid communication with the at least one passage and being oriented at an angle with respect to horizontal when in use.

At least some of the objects, features and advantages that may be achieved by at least certain embodiments of the invention include providing a tank ventilation device that separates liquid and gas phases of a fluid, facilitates draining of liquid off a gas and liquid separator of the device, can be used with a pressure relief valve or a vapor recovery canister, prevents liquid fuel from contaminating a pressure relief valve or a vapor recover canister, and is of relatively simple design and economical manufacture and assembly, rugged, durable, reliable and in service has a long useful life.

Of course, other objects, features and advantages will be apparent in view of this disclosure to those skilled in the art. Other fuel systems, fuel tanks, fuel additive tanks, and components embodying the invention may achieve more or less than the noted objects, features or advantages.

BRIEF DESCRIPTION OF THE DRAWINGS

These and other objects, features and advantages of the present invention will be apparent from the following detailed description of the preferred embodiments and best mode, appended claims, and accompanying drawings in which:

FIG. 4b is a bottom view of the gas and liquid separation device of FIG. 4a;

FIG. 5a is a perspective view of a presently preferred form of a fuel tank ventilation system; and FIG. 5b is a cross-section view of a second presently preferred form of a ventilation device used with the fuel tank ventilation system of FIG. 5a.

DETAILED DESCRIPTION OF THE PREFERRED EMBODIMENTS

Figure 1:
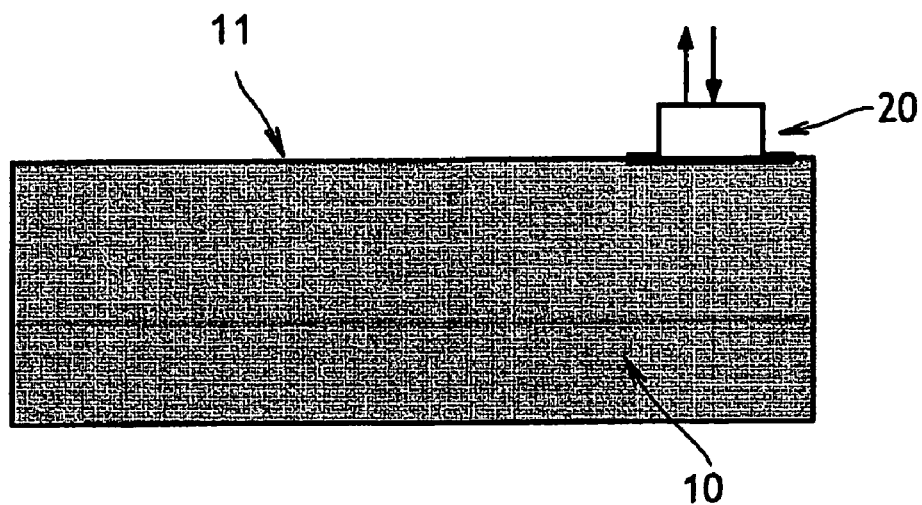
FIG. 1 is a side view of a fuel tank having a ventilation device according to the prior art.
Figure 2:
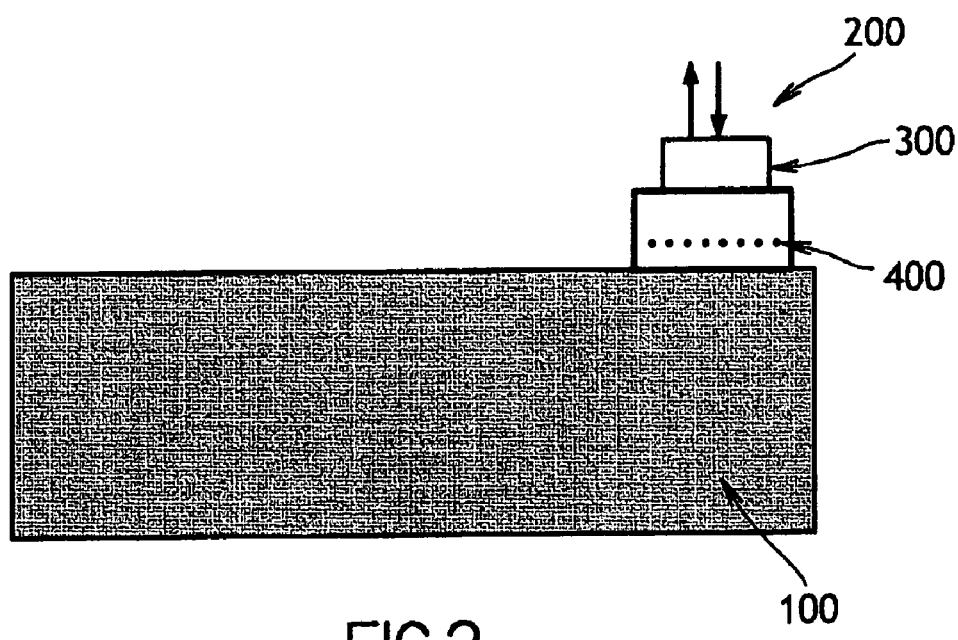
FIG. 2 is a side view of a presently preferred form of a fuel tank having a presently preferred form of a ventilation device.

Referring in more detail to the drawings, FIG. 2 shows a ventilation device 200 of a fuel tank 100, which may be a petroleum fuel tank, fuel additive tank, or the like. The ventilation device 200 includes a single pressure relief valve 300 and another ventilation device, which is a gas and liquid separation device 400 associated with the valve 300. The separation device 400 is interposed between the valve 300 and the interior of the tank 100 at a ventilation passage (not shown) through the upper wall of the fuel tank 100. According to an alternative embodiment not shown, the tank 100 may have several ventilation holes or passages from which corresponding ventilation conduits extend and join together at a junction, downstream from which lies a single pressure relief valve (not shown) associated with a gas and liquid separator (not shown).

Figure 3:
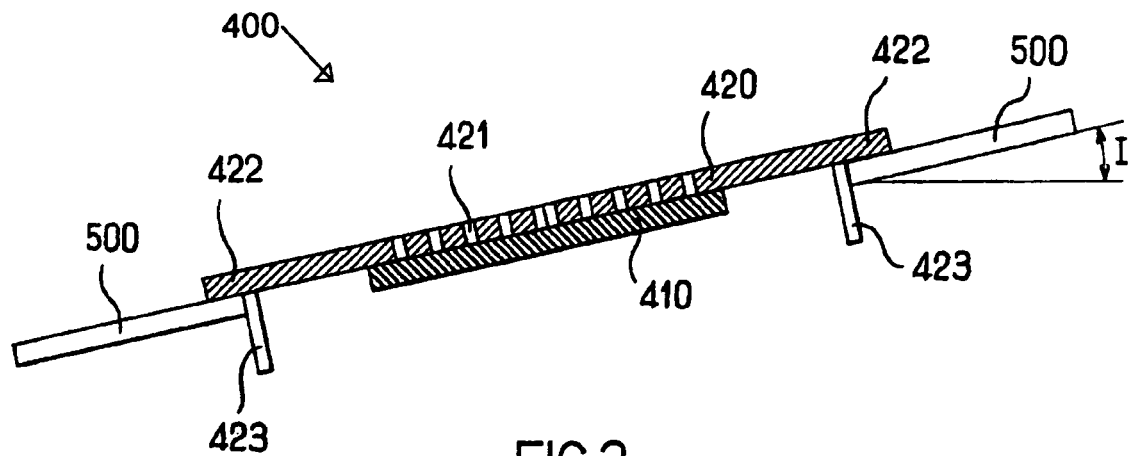
FIG. 3 is a cross-sectional view of a first presently preferred form of a gas and liquid separation device of the ventilation device of FIG. 2.

Referring generally to FIGS. 2 and 3, the separation device 400 allows gaseous fuel, but blocks liquid fuel, from flowing from the interior of the tank 100 and to escape into the atmosphere or into a valve, vapor recovery canister, or the like. Thus, the liquid contained in the tank 100 cannot flow or escape through the separation device 400 when the valve 300 opens. Moreover, the valve 300 can not be wetted by the liquid fuel contained in the tank 100. Thus any problem related to the jamming of the valve 300 or the clogging of any valve passage is avoided. The valve 300 may sustain a vapor-saturated atmosphere around the separation device 400, such as between the tank 100 and the separation device 400 and/or between the separation device 400 and the valve 300.

As shown in FIG. 3, the separation device 400 preferably comprises a gas and liquid separator 410, such as a semi-permeable membrane. The term semi-permeable membrane includes a membrane that allows gaseous fuel to escape or flow therethrough and, conversely, blocks liquid fuel from escaping or flowing therethrough. According to an alternative, the separator 410 may be a porous membrane that includes a plurality of pores and that allows gaseous fuel to escape or flow therethrough and, conversely, blocks liquid fuel from escaping or flowing therethrough. The separator 410 may be composed of a chemically non-polar material, in the case where the fluid contained in the tank 100 is of a polar nature. Alternatively, the separator 410 may be composed of a polar material if the fluid contained in the tank 100 is of non-polar nature. It is also contemplated that the separator 410 may be composed of an oil repellent material. Specific examples of membrane material include Temish® and Gore-Tex® brand materials available, respectively, from Nitto Denko Corporation of Osaka, Japan, and from W.L. Gore & Associates, Inc. of Newark, Del. The shape of the separator 410 is preferably substantially circular in shape, but any other suitable shape is conceivable.

FIG. 3 more clearly illustrates a first embodiment of the separation device 400, which includes a substantially planar separator 410 and a substantially planar support body 420 carrying the separator 410. Preferably, the separator 410 is bonded, welded, or otherwise suitably mounted to the support body 420. The pressure relief valve 300 (shown in FIG. 2) is preferably placed as close as possible to the separator 410 and/or the support body 420.

The support body 420 includes a plurality of bores or passages 421 extending therethrough to permit gases or gaseous fuel flowing from the fuel tank 100 to escape or flow therethrough toward the pressure relief valve 300, after having passed through the separator 410. The use of multiple passages 421 also avoids the problem of any stress concentrations on the separator 410 due to localized pressure build up, thereby preventing any sagging, ripping, breaking off, or detachment of the separator 410. In other words, the plurality of passages 421 more evenly distributes fluid pressure on the separator 410 compared to a single passage 421. The passages 421 define orifices whose shape can vary and whose quantity is unlimited. The shape of the passages 421 may be substantially rectangular, substantially circular, or the like. The support body 420 also ensures that the support body 420 and separator 410 remain in position in relation to a structural support 500.

The structural support 500 may be an upper wall of the fuel tank 100, directly connected to the tank 100, or indirectly connected to the tank 100 via an intermediate connection element such as a pipe or conduit. The structural support 500 carries the support body 420 and, thus, the separator 410. Preferably, the support body 420 is welded, or otherwise suitably mounted to the structural support 500 about its periphery 422. A protrusion 423, preferably cylindrical in shape, is integral with an inner surface of the support body 420, and facilitates the positioning of the support body 420 and the separator 410 in relation to the structural support 500. In suitable configurations, the protrusion 423 may facilitate positioning of the intermediate connection element between the structural support 500 and the tank 100. The overall shape of the support body 420 and consequently of the corresponding opening in the structural support 500 are preferably adapted to the shape of the separator 410.

The separation device 400 of FIG. 3 is disposed or oriented at an angle I in relation to the horizontal. The term horizontal includes a plane generally defined by an upper surface of liquid fuel contained in the tank 100 when the tank 100, for storage or when fitted to a motor vehicle, is in a normal position. In any case, the angle I is configured to facilitate runoff or draining of the liquid fuel present on the separator 410 so as to ensure that the separator operates correctly to pass gaseous fuel therethrough without becoming clogged with build up of liquid fuel thereon. The angle at which the separator 410 may be oriented may range from 0° to 90° in relation to the horizontal. Preferably, however, the angle is substantially or approximately 90° with respect to the horizontal or substantially or approximately 0° with respect to the vertical, so as to allow for optimal draining of liquid fuel from the separator 410.

Figure 4A:
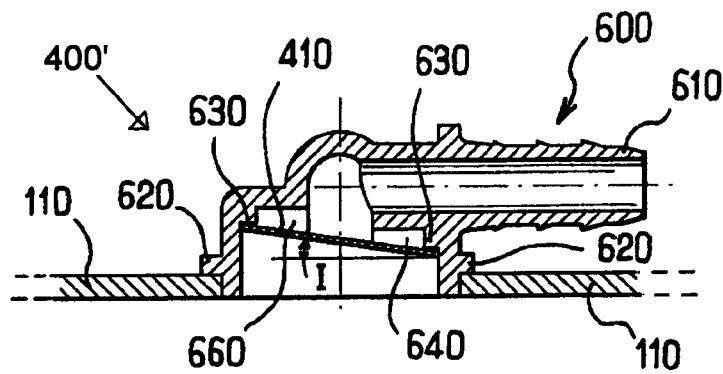
FIG. 4a is a cross-sectional view of a second presently preferred form of a gas and liquid separation device.
Figure 4B:
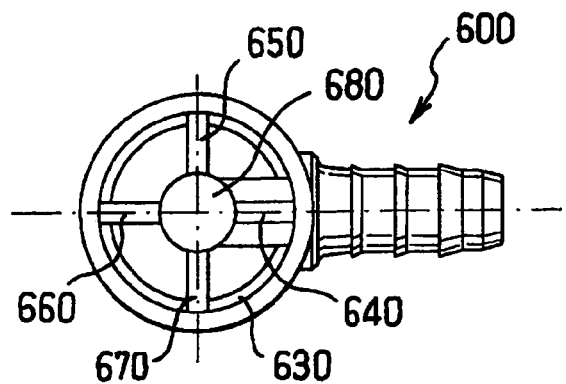

FIGS. 4a and 4b illustrate another presently preferred embodiment of a gas and liquid separation device 400'. This embodiment is similar in many respects to the embodiment of FIGS. 2 and 3 and like numerals between the embodiments generally designate like or corresponding elements throughout the several views of the drawing Figures. Additionally, the description of the common subject matter may generally not be repeated here.

In this embodiment, the separation device 400' includes a pipette or fluid fitting 600 and the substantially planar separator 410 carried by the fitting 600. The fitting 600 is carried by another structural support such as the upper wall 110 of the fuel tank 100, and may include a projection or flange 620 which is preferably bonded, welded, or otherwise suitably attached to the wall 110 of the tank 100 or, if desired, to an intermediate connection element (not shown) linking the fitting 600 to the tank 100.

The fitting 600 includes a substantially circular support zone 630 on which the separator 410 is carried. The separator 410 is preferably bonded, welded, or otherwise sealably mounted to the fitting 600 about the periphery of the separator 410. The fitting 600 thus acts as a support body to the separator 410 similar to the function of the support body 420 disclosed in FIG. 3.

As best shown in FIG. 4b, the fitting 600 also includes a plurality of grooves 640, 650, 660 and 670 defined within the circular support zone 630. The grooves 640, 650, 660 and 670 establish passages and serve a similar function as the passages 421 of the support body 420 described with respect to the embodiment of FIG. 3. In FIG. 4b, preferably four grooves 640, 650, 660 and 670 are represented and positioned to form a cross. However, a different quantity of grooves and/or a different orientation is contemplated. These grooves 640, 650, 660 and 670 are in communication with the orifice 680 and are adjacent the separator 410. Material of the fitting 600 between the grooves 640, 650, 660 and 670 supports the separator 410 so that it is not sucked in at its center towards the orifice 680 when, for example, the pressure relief valve (not represented) is opened. Otherwise, the separator 410 would distort and could result in damage thereto.

The separator 410 is preferably angled in relation to the horizontal to facilitate the runoff or draining of the liquid fuel present on the separator 410. The rapid evacuation of splashed liquid fuel off the separator 410 facilitates proper operation of the device. However, it is also contemplated that the separator 410 may be placed in a non-sloping position, substantially parallel to the horizontal. It is also contemplated that the separator 410 need not be installed within the fitting 600 but may be installed in another connection element, conduit, valve housing, or the like, inline between the fitting 600 and a downstream pressure relief valve, vapor recovery canister, or the like.

Figures 5A, 5B:
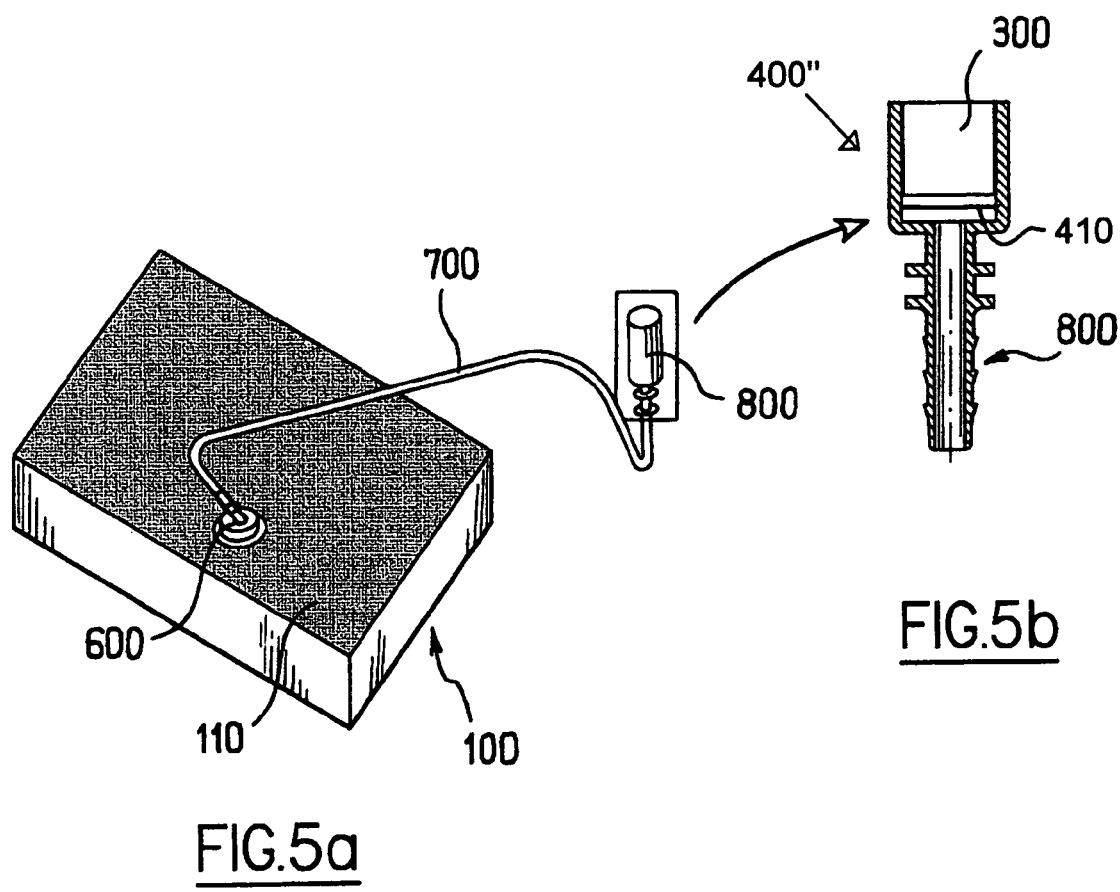

Accordingly, FIGS. 5a and 5b illustrate another presently preferred embodiment of a gas and liquid separation device 400". This embodiment is similar in many respects to the embodiment of FIGS. 2 through 4b and like numerals between the embodiments generally designate like or corresponding elements throughout the several views of the drawing Figures. Additionally, the description of the common subject matter may generally not be repeated here.

FIG. 5a illustrates the fuel tank 100, its upper wall 110 that carries the fitting 600. The fitting 600 may be connected to one end of a pipe or conduit 700, wherein another end of the conduit 700 may be connected to the separation device 400" which includes a valve housing 800. The valve housing 800 shown in FIG. 5b carries a pressure relief valve 300 and the gas and liquid separator 410, which allows gas flowing from the tank 100 to escape to the pressure relief valve 300 and, ultimately, to the atmosphere. It is also contemplated that the separator 410 may permit gas to enter the tank 100, while blocking liquid from entering the tank 100. In this embodiment, the separator 410 is located between the tank 100 and the pressure relief valve 300. The separator 410 may be disposed at an angle similar to the previous embodiments. The valve housing 800 is preferably sealably fixed to the conduit 700 and the conduit 700 and valve housing 800 define intermediate connection elements between the tank 100 and the pressure relief valve 300.

The above description is based on the specific case where the ventilation element 300 is a pressure relief valve, however, for some applications, notably for fuel tanks, the ventilation element 300 may be a vapor recovery canister. Many fuel tanks include a plurality of ventilation passages through the upper wall 110 of the tank 100. One or more of these passages may be fitted with a "Roll Over Valve" (ROV) which closes and blocks its corresponding passage in the fuel tank 100 in the event the tank 100 is overturned or when liquid fuel sloshes around in the fuel tank 100 in the vicinity of the upper wall 110 of the tank 100. In an event where such an ROV device somehow allows liquid fuel to escape, a downstream vapor recovery canister may thus become impregnated with liquid fuel and become inoperable until the fuel evaporates. Therefore it is beneficial to interpose separators 410 between the passages in the upper wall 110 of the tank 100 and downstream devices such as the canister 300. Accordingly, it is possible to omit use of ROV's, their function being assumed by the separator 410.

Another specific application relates to fuel tanks particular to the automotive market in the United States. Ventilation devices associated with these tanks comprise large canisters so that substantially all gaseous fuel flowing from the fuel tank is recovered by the canister, notably during refilling of the tank which action tends to generate a large amount of gaseous fuel. Ventilation devices may also comprise fill limit vent valves (FLVV), which during the refilling of the tank, allow a fuel pump nozzle to actuate and thus fill the tank. However, the displacement of the fill limit vent valve can project fuel onto the canister and adversely affect its correct operating. The use of a separator 410 tends to prevent clogging and malfunctioning of the vapor recovery canister 300. The canister is therefore protected by the separator 410.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the invention is not limited to the particular exemplary embodiments disclosed herein, but rather is defined by the claims below. In other words, the statements contained in the foregoing description relate to particular exemplary embodiments and are not to be construed as limitations on the scope of the invention as claimed below or on the definition of terms used in the claims, except where a term or phrase is expressly defined above.

Although the present invention has been disclosed in conjunction with a limited number of presently preferred exemplary embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. In another example, the invention has been disclosed in conjunction with an automotive fuel tank. However, additional applications are contemplated for the gas and liquid separator, such as aviation, marine, or construction fuel tanks, or any other fuel tank applications where it is desirable to use a gas and liquid separator, and can be provided without departing from the disclosure. Indeed, the present invention is intended to embrace all such forms, ramifications, modifications, variations, substitutions, and/or equivalents as fall within the spirit and broad scope of the following claims.

What is claimed is:

1. A gas and liquid separation device for a motor vehicle fuel tank containing a volatile petrolic liquid fuel and petrolic fuel vapor, comprising:

a body having at least one passage therethrough with an inlet configured for fluid communication with the fuel tank and an outlet configured for fuel vapor flow through the outlet; and a separator carried by the body in the at least one passage between and in fluid communication with the inlet and outlet, the separator having a membrane which is semi-permeable or porous with a plurality of pores constructed and arranged to allow the fuel vapor to pass through the membrane to the outlet and block the liquid fuel from passing through the membrane to the outlet and the membrane being inclined at an angle to the horizontal to facilitate runoff of liquid fuel from the membrane when a motor vehicle in which the fuel tank is received is in a normal operating position.

2. The gas and liquid separation device of claim 1, wherein the separator is substantially oriented vertically.

3. The gas and liquid separation device of claim 1, wherein the separator is a semi-permeable membrane.

4. The gas and liquid separation device of claim 3, wherein the semi-permeable membrane is mounted to the body.

5. The gas and liquid separation device of claim 4, wherein the body includes grooves adjacent to which the semi-permeable membrane is placed.

6. The gas and liquid separation device of claim 1, wherein the membrane comprises a chemically non-polar material and the liquid contained in the tank is of polar nature.

7. The gas and liquid separation device of claim 1, wherein the membrane comprises a chemically polar material and the liquid contained in the tank is of non-polar nature.

8. The gas and liquid separation device of claim 1, wherein the membrane comprises an oil repellent material.

9. The gas and liquid separation device of claim 1, wherein the membrane is substantially circular in shape.

10. The gas and liquid separation device of claim 1, wherein the body is an upper wall of the tank.

11. The gas and liquid separation device of claim 1, wherein the body is a connection element carried by the tank.

12. The gas and liquid separation device of claim 11, wherein the connection element is a conduit.

13. The gas and liquid separation device of claim 1, wherein the body is a housing carrying the separator wherein the housing is in fluid communication with the tank via a conduit.

14. A motor vehicle fuel tank ventilation system, comprising:
    a fuel tank configured to contain a volatile petrolic liquid fuel and petrolic fuel vapor;
    a ventilation device in fluid communication with the fuel tank; and
    a separator disposed in fluid communication between the fuel tank and the device and the separator having a membrane which is semi-permeable or porous with a plurality of pores constructed and arranged to allow the fuel vapor to pass through the membrane to the outlet and block the liquid fuel from passing through the membrane and the membrane being inclined at an angle to the horizontal to facilitate runoff of liquid fuel from the membrane when a motor vehicle in which the fuel tank is received is in a normal operating position.

15. The fuel tank ventilation system of claim 14, wherein the device is a pressure relief valve.

16. The fuel tank ventilation system of claim 14, wherein the ventilation device is a vapor recovery canister.

17. The fuel tank ventilation system of claim 14, wherein the tank contains fuel.

18. The fuel tank ventilation system of claim 14, wherein the tank contains a fuel additive.

19. A ventilation configuration for a motor vehicle fuel tank, comprising:
    a ventilation device in fluid communication with the fuel tank and including at least one of a pressure relief valve or a vapor recovery canister;
    a body having a plurality of passages therethrough and configured for fluid communication between the ventilation device and the fuel tank; and
    a separator carried by the body in fluid communication with the plurality of passages and, the separator having a membrane which is semi-permeable or porous with a plurality of pores constructed and arranged to allow the fuel vapor to pass through the membrane to the ventilation device and block the liquid fuel from passing through the membrane and the membrane being inclined at an angle to the horizontal to facilitate runoff of liquid fuel from the membrane when a motor vehicle in which the fuel tank is received is in a normal operating position.

20. A method of ventilating a fuel tank or a motor vehicle containing a volatile petrolic liquid fuel and petrolic fuel vapor comprising:
    providing a fuel tank which during normal motor vehicle operation is closed and contains a volatile petrolic liquid fuel and petrolic fuel vapor; and
    providing a separator having a passage with an inlet communicating with the interior of the fuel tank and an outlet through which petrolic liquid fuel vapor flows from the fuel tank and a membrane which is in the passage between and in fluid communication with the inlet and outlet and which is semi-permeable or porous with a plurality of pores constructed and arranged to allow at least a portion of the fuel vapor to pass through the membrane to the outlet to remove fuel vapor from the tank and to block the liquid fuel in the tank from passing through the membrane and the membrane is inclined at an angle to the horizontal to facilitate runoff of liquid fuel from the membrane when a motor vehicle in which the fuel tank is received is in a normal operating position.

* * * * *